(12) United States Patent
Sampsell

(10) Patent No.: US 8,169,688 B2
(45) Date of Patent: May 1, 2012

(54) SYSTEM AND METHOD OF REDUCING COLOR SHIFT IN A DISPLAY

(75) Inventor: Jeffrey B. Sampsell, Pueblo West, CO (US)

(73) Assignee: QUALCOMM MEMS Technologies, Inc., San Diego, CA (US)

(*) Notice: Subject to any disclaimer, the term of this patent is extended or adjusted under 35 U.S.C. 154(b) by 0 days.

(21) Appl. No.: 12/724,329

(22) Filed: Mar. 15, 2010

(65) Prior Publication Data

US 2010/0172012 A1    Jul. 8, 2010

Related U.S. Application Data

(62) Division of application No. 11/041,020, filed on Jan. 21, 2005, now Pat. No. 7,813,026.

(60) Provisional application No. 60/613,482, filed on Sep. 27, 2004.

(51) Int. Cl.
G02B 26/00 (2006.01)
G02B 26/08 (2006.01)
G02F 1/29 (2006.01)

(52) U.S. Cl. ....................... 359/290; 359/298

(58) Field of Classification Search .......... 359/290–292, 359/295, 298
See application file for complete search history.

(56) References Cited

U.S. PATENT DOCUMENTS

| 4,154,219 A | 5/1979 | Gupta et al. |
| 4,282,862 A | 8/1981 | Soleau |
| 4,375,312 A | 3/1983 | Tangonan |
| 4,378,567 A | 3/1983 | Mir |
| 4,863,224 A | 9/1989 | Afian |
| 4,974,942 A | 12/1990 | Gross |
| 5,050,946 A | 9/1991 | Hathaway |
| 5,123,247 A | 6/1992 | Nelson |
| 5,151,585 A | 9/1992 | Siebert |
| 5,221,982 A | 6/1993 | Faris |
| 5,339,179 A | 8/1994 | Rudisill |
| 5,448,659 A | 9/1995 | Tsutsui et al. |
| 5,555,160 A | 9/1996 | Tawara |
| 5,592,332 A | 1/1997 | Nishio |
| 5,664,862 A | 9/1997 | Redmond et al. |
| 5,671,994 A | 9/1997 | Tai |
| 5,712,694 A | 1/1998 | Taira et al. |

(Continued)

FOREIGN PATENT DOCUMENTS

CA    2 490 975    1/2004

(Continued)

OTHER PUBLICATIONS

Goosen, "MEMS-Based Variable Optical Interference Devices", IEEE/LEOS International Conference on Optical MEMS, pp. 17-18, Aug. 2000.

(Continued)

*Primary Examiner* — Joseph P Martinez
*Assistant Examiner* — Brandi Thomas
(74) *Attorney, Agent, or Firm* — Knobbe, Martens, Olson and Bear, LLP

(57) ABSTRACT

A system and method of reducing color shift in a display includes an interferometric modulator display configured to reflect light from at least one light source and through at least one converging optical element in an optical path from the light source to a viewer via the display. In one embodiment, the converging optical element comprises a diffractive optical element.

47 Claims, 9 Drawing Sheets

U.S. PATENT DOCUMENTS

| | | |
|---|---|---|
| 5,771,124 A | 6/1998 | Kintz |
| 5,782,993 A | 7/1998 | Ponewash |
| 5,783,614 A | 7/1998 | Chen |
| 5,845,035 A | 12/1998 | Wimberger-Friedl |
| 5,914,760 A | 6/1999 | Daiku |
| 5,961,198 A | 10/1999 | Hira |
| 6,021,007 A | 2/2000 | Murtha |
| 6,074,069 A | 6/2000 | Chao-Ching |
| 6,099,134 A | 8/2000 | Taniguchi |
| 6,123,431 A | 9/2000 | Teragaki |
| 6,259,854 B1 | 7/2001 | Shinji et al. |
| 6,283,602 B1 | 9/2001 | Kawaguchi et al. |
| 6,323,892 B1 | 11/2001 | Mihara |
| 6,323,987 B1 | 11/2001 | Rinuado |
| 6,377,535 B1 | 4/2002 | Chen et al. |
| 6,379,017 B2 | 4/2002 | Nakabayashi et al. |
| 6,407,785 B1 | 6/2002 | Yamazaki |
| 6,454,452 B1 | 9/2002 | Sasagawa |
| 6,494,588 B1 | 12/2002 | Okada |
| 6,512,626 B1 | 1/2003 | Schmidt |
| 6,540,368 B2 | 4/2003 | Akaoka |
| 6,561,661 B2 | 5/2003 | Egawa |
| 6,565,225 B2 | 5/2003 | Mabuchi et al. |
| 6,580,496 B2 | 6/2003 | Bamji |
| 6,582,095 B1 | 6/2003 | Toyoda |
| 6,592,234 B2 | 7/2003 | Epstein |
| 6,603,520 B2 | 8/2003 | Umemoto |
| 6,631,998 B2 | 10/2003 | Egawa et al. |
| 6,636,358 B2 | 10/2003 | Umemoto et al. |
| 6,652,109 B2 | 11/2003 | Nakamura |
| 6,657,683 B2 | 12/2003 | Richard |
| 6,659,615 B2 | 12/2003 | Umemoto |
| 6,667,782 B1 | 12/2003 | Taira et al. |
| 6,669,350 B2 | 12/2003 | Yamashita |
| 6,680,792 B2 * | 1/2004 | Miles ........................... 359/291 |
| 6,685,342 B2 | 2/2004 | Terada |
| 6,706,339 B1 | 3/2004 | Miyatake et al. |
| 6,709,123 B2 | 3/2004 | Flohr |
| 6,747,801 B2 | 6/2004 | Umemoto |
| 6,751,023 B2 | 6/2004 | Umemoto et al. |
| 6,761,461 B2 | 7/2004 | Mizutani et al. |
| 6,778,746 B2 | 8/2004 | Charlton |
| 6,784,948 B2 | 8/2004 | Kawashima et al. |
| 6,819,380 B2 | 11/2004 | Wen et al. |
| 6,826,000 B2 | 11/2004 | Lee et al. |
| 6,862,141 B2 | 3/2005 | Olczak |
| 6,865,312 B2 | 3/2005 | Niv et al. |
| 6,879,354 B1 | 4/2005 | Sawayama |
| 6,883,924 B2 | 4/2005 | Maeda et al. |
| 6,891,530 B2 | 5/2005 | Umemoto |
| 6,960,010 B2 | 11/2005 | Matsumoto et al. |
| 6,964,484 B2 | 11/2005 | Gupta |
| 6,998,196 B2 | 2/2006 | Rich et al. |
| 7,010,212 B2 | 3/2006 | Emmons et al. |
| 7,046,409 B2 | 5/2006 | Kihara |
| 7,068,948 B2 * | 6/2006 | Wei et al. ........................ 398/184 |
| 7,072,096 B2 | 7/2006 | Holman et al. |
| 7,099,058 B2 | 8/2006 | Takemori et al. |
| 7,128,459 B2 | 10/2006 | Igarashi et al. |
| 7,133,022 B2 | 11/2006 | Grabert |
| 7,186,014 B2 | 3/2007 | Shimura |
| 7,218,429 B2 | 5/2007 | Batchko |
| 7,221,418 B2 | 5/2007 | Lee |
| 7,223,010 B2 | 5/2007 | Min |
| 7,262,754 B1 | 8/2007 | Yamazaki |
| 7,324,248 B2 | 1/2008 | Brotherton-Ratcliffe et al. |
| 7,360,899 B2 | 4/2008 | McGuire |
| 7,360,939 B2 | 4/2008 | Sugiura |
| 7,375,779 B2 | 5/2008 | Lee et al. |
| 7,376,308 B2 | 5/2008 | Cheben et al. |
| 7,380,969 B2 | 6/2008 | Yamashita |
| 7,400,439 B2 | 7/2008 | Holman |
| 7,417,735 B2 | 8/2008 | Cummings |
| 7,417,784 B2 | 8/2008 | Sasagawa |
| 7,450,295 B2 | 11/2008 | Tung |
| 7,498,621 B2 | 3/2009 | Seitz |
| 7,532,800 B2 | 5/2009 | Iimura |
| 7,557,935 B2 | 7/2009 | Baruch |
| 7,603,001 B2 | 10/2009 | Wang |
| 7,643,203 B2 | 1/2010 | Gousev et al. |
| 7,653,371 B2 | 1/2010 | Floyd |
| 7,706,050 B2 | 4/2010 | Sampsell |
| 7,710,636 B2 | 5/2010 | Chui |
| 7,733,439 B2 | 6/2010 | Sampsell |
| 7,750,886 B2 | 7/2010 | Sampsell |
| 7,813,026 B2 | 10/2010 | Sampsell |
| 7,845,841 B2 | 12/2010 | Sampsell |
| 7,848,001 B2 | 12/2010 | Miles |
| 7,864,395 B2 | 1/2011 | Chui |
| 7,907,319 B2 | 3/2011 | Miles |
| 7,944,602 B2 | 5/2011 | Chui |
| 2002/0008969 A1 | 1/2002 | Mabuchi et al. |
| 2002/0101551 A1 | 8/2002 | Akaoka |
| 2002/0126364 A1 * | 9/2002 | Miles ........................... 359/247 |
| 2002/0154256 A1 | 10/2002 | Gotoh |
| 2002/0176035 A1 | 11/2002 | Yamazaki |
| 2003/0026536 A1 | 2/2003 | Ho |
| 2003/0030764 A1 | 2/2003 | Lee |
| 2003/0034445 A1 | 2/2003 | Boyd et al. |
| 2003/0071947 A1 | 4/2003 | Shiraogawa |
| 2003/0083429 A1 | 5/2003 | Smith |
| 2003/0086030 A1 | 5/2003 | Taniguchi |
| 2003/0086031 A1 | 5/2003 | Taniguchi |
| 2003/0090887 A1 | 5/2003 | Igarashi |
| 2003/0103344 A1 | 6/2003 | Niida |
| 2003/0123245 A1 | 7/2003 | Parker |
| 2003/0128538 A1 | 7/2003 | Shinohara et al. |
| 2003/0165067 A1 | 9/2003 | Imamura |
| 2003/0184989 A1 | 10/2003 | Matsumoto et al. |
| 2003/0210367 A1 | 11/2003 | Nakano |
| 2003/0214728 A1 | 11/2003 | Olczak |
| 2004/0001169 A1 | 1/2004 | Saiki |
| 2004/0135494 A1 | 7/2004 | Miyatake |
| 2004/0188599 A1 | 9/2004 | Viktorovitch |
| 2004/0217264 A1 | 11/2004 | Wood |
| 2004/0228109 A1 | 11/2004 | Leu |
| 2004/0228112 A1 | 11/2004 | Takata |
| 2005/0002175 A1 | 1/2005 | Matsui et al. |
| 2005/0024849 A1 | 2/2005 | Parker |
| 2005/0024890 A1 | 2/2005 | Yamamoto |
| 2005/0030732 A1 | 2/2005 | Kimura |
| 2005/0041175 A1 | 2/2005 | Akiyama |
| 2005/0046011 A1 | 3/2005 | Chen |
| 2005/0069254 A1 | 3/2005 | Schultheis |
| 2005/0088719 A1 | 4/2005 | Patel |
| 2005/0117190 A1 | 6/2005 | Iwauchi et al. |
| 2005/0185416 A1 | 8/2005 | Lee et al. |
| 2005/0206802 A1 | 9/2005 | Creemers |
| 2005/0231981 A1 | 10/2005 | Hoelen et al. |
| 2005/0259302 A9 | 11/2005 | Metz et al. |
| 2005/0270798 A1 | 12/2005 | Lee et al. |
| 2005/0271325 A1 | 12/2005 | Anderson |
| 2006/0002655 A1 | 1/2006 | Smits |
| 2006/0002675 A1 | 1/2006 | Choi |
| 2006/0051048 A1 | 3/2006 | Gardiner |
| 2006/0061705 A1 | 3/2006 | Onishi |
| 2006/0062016 A1 | 3/2006 | Dejima |
| 2006/0110090 A1 | 5/2006 | Ellwood |
| 2006/0164861 A1 | 7/2006 | Maeda |
| 2007/0064294 A1 | 3/2007 | Hoshino et al. |
| 2007/0133935 A1 | 6/2007 | Fine |
| 2007/0147087 A1 | 6/2007 | Parker |
| 2007/0171418 A1 | 7/2007 | Nyhart |
| 2007/0187852 A1 | 8/2007 | Parker et al. |
| 2008/0090025 A1 | 4/2008 | Freking |
| 2009/0126777 A1 | 5/2009 | Khazeni et al. |
| 2009/0126792 A1 | 5/2009 | Gruhlke |
| 2009/0147332 A1 | 6/2009 | Bita et al. |
| 2009/0147535 A1 | 6/2009 | Mienko |
| 2009/0168459 A1 | 7/2009 | Holman et al. |
| 2009/0199893 A1 | 8/2009 | Bita et al. |
| 2009/0199900 A1 | 8/2009 | Bita et al. |
| 2009/0257108 A1 | 10/2009 | Gruhlke |
| 2009/0296193 A1 | 12/2009 | Bita et al. |
| 2009/0303746 A1 | 12/2009 | Wang |
| 2009/0323144 A1 | 12/2009 | Gruhlke |
| 2010/0051089 A1 | 3/2010 | Khazeni |

| | | | |
|---|---|---|---|
| 2010/0053148 A1 | 3/2010 | Khazeni | |
| 2010/0149624 A1 | 6/2010 | Kothari | |
| 2010/0177533 A1 | 7/2010 | Griffiths | |
| 2010/0231510 A1 | 9/2010 | Sampsell et al. | |
| 2010/0302218 A1 | 12/2010 | Bita | |
| 2010/0302616 A1 | 12/2010 | Bita | |
| 2010/0302802 A1 | 12/2010 | Bita | |
| 2010/0302803 A1 | 12/2010 | Bita | |
| 2010/0309687 A1 | 12/2010 | Sampsell et al. | |

FOREIGN PATENT DOCUMENTS

| | | |
|---|---|---|
| CN | 1639596 A | 7/2005 |
| CN | 1755494 A | 4/2006 |
| CN | 1795403 A | 6/2006 |
| EP | 0 278 038 | 8/1988 |
| EP | 0 539 099 | 4/1993 |
| EP | 0 621 500 | 10/1994 |
| EP | 0 879 991 | 11/1998 |
| EP | 0 984 314 | 3/2000 |
| EP | 1 116 987 | 7/2001 |
| EP | 1 122 586 | 8/2001 |
| EP | 1 143 270 | 10/2001 |
| EP | 1 296 094 | 3/2003 |
| EP | 1 336 876 | 8/2003 |
| EP | 1 389 775 | 2/2004 |
| EP | 1 577 701 | 9/2005 |
| EP | 1 640 764 | 3/2006 |
| EP | 1 640 778 | 3/2006 |
| EP | 1 762 778 A | 3/2007 |
| EP | 2 241 923 | 10/2010 |
| GB | 2 315 356 | 1/1998 |
| GB | 2 331 615 | 5/1999 |
| GB | 2 351 834 | 1/2001 |
| JP | 05 281479 | 10/1993 |
| JP | 07-509327 | 10/1995 |
| JP | 09 171111 | 6/1997 |
| JP | 09-507920 | 8/1997 |
| JP | 11 167808 | 6/1999 |
| JP | 11 211999 | 8/1999 |
| JP | 11 326898 | 11/1999 |
| JP | 2000 081848 | 3/2000 |
| JP | 2000 147262 | 5/2000 |
| JP | 2000 181367 | 6/2000 |
| JP | 2000 314882 | 11/2000 |
| JP | 2001-021883 | 1/2001 |
| JP | 2001-283622 | 10/2001 |
| JP | 2002 72284 | 3/2002 |
| JP | 2002-098838 | 4/2002 |
| JP | 2002-108227 | 4/2002 |
| JP | 2002 174732 | 6/2002 |
| JP | 2002 174780 | 6/2002 |
| JP | 2002 297044 | 10/2002 |
| JP | 2002-365438 | 12/2002 |
| JP | 2003 057653 | 2/2003 |
| JP | 2003-149642 | 5/2003 |
| JP | 2003-149643 | 5/2003 |
| JP | 2003 186008 | 7/2003 |
| JP | 2003 344881 | 12/2003 |
| JP | 2004-012918 | 1/2004 |
| JP | 2004-062099 | 2/2004 |
| JP | 2004-510185 | 4/2004 |
| JP | 2005-259365 | 9/2005 |
| JP | 2005-316178 | 11/2005 |
| JP | 2006-065360 A | 3/2006 |
| JP | 2006 099105 | 4/2006 |
| JP | 2006 107993 | 4/2006 |
| JP | 2007 027150 | 2/2007 |
| TW | 567388 | 12/2003 |
| WO | WO 97/46908 | 12/1997 |
| WO | WO 98/19201 | 5/1998 |
| WO | WO 99/04296 A | 1/1999 |
| WO | WO 99/64785 A | 12/1999 |
| WO | WO 00/50807 | 8/2000 |
| WO | WO 01/29148 | 4/2001 |
| WO | WO 01/57434 | 8/2001 |
| WO | WO 01/84229 | 11/2001 |
| WO | WO 02/35145 A1 | 5/2002 |
| WO | WO 2004/114418 A1 | 12/2004 |
| WO | WO 2005/073622 A1 | 8/2005 |
| WO | WO 2006/035698 A1 | 4/2006 |
| WO | WO 2008/045200 | 4/2008 |
| WO | WO 2008/045207 | 4/2008 |
| WO | WO 2008/045218 | 4/2008 |
| WO | WO 2008/045312 | 4/2008 |

OTHER PUBLICATIONS

Huang et al. "Multidirectional Aymmetrical Microlens-Array Light Control Films for High Performance Reflective Liquid Crystal Displays," SID Digest, 2002, pp. 870-873.
Austrian Search Report for U.S. Appl. No. 11/040,824 dated Jul. 14, 2005.
Extended European Search Report in Application No. 10170501, dated Sep. 16, 2010.
Office Action in U.S. Appl. No. 11/041,020 dated May 21, 2007.
Response to Office Action in U.S. Appl. No. 11/041,020, dated Aug. 21, 2007.
Office Action in U.S. Appl. No. 11/041,020 dated Nov. 5, 2007.
Amendment in U.S. Appl. No. 11/041,020 dated Jan. 7, 2008.
Advisory Action in U.S. Appl. No. 11/041,020 dated Feb. 14, 2008.
Interview Summary in U.S. Appl. No. 11/041,020 dated Mar. 28, 2008.
Request for Continued Examination and Amendment in U.S. Appl. No. 11/041,020 dated Apr. 14, 2008.
Official Communication in U.S. Appl. No. 11/041,020 dated Jul. 11, 2008.
Response in U.S. Appl. No. 11/041,020 dated Oct. 10, 2008.
Notice of Allowance in U.S. Appl. No. 11/041,020 dated Jan. 8, 2009.
Request for Continued Examination and Information Disclosure Statement in U.S. Appl. No. 11/041,020 dated Apr. 7, 2009.
Notice of Allowance in U.S. Appl. No. 11/041,020 dated Jun. 16, 2009.
Request for Continued Examination and Amendment in U.S. Appl. No. 11/041,020 dated Sep. 15, 2009.
Notice of Allowance in U.S. Appl. No. 11/041,020 dated Oct. 20, 2009.
Request for Continued Examination and Information Disclosure Statement in U.S. Appl. No. 11/041,020 dated Nov. 13, 2009.
Notice of Allowance in U.S. Appl. No. 11/041,020 dated Dec. 16, 2009.
Request for Continued Examination and Information Disclosure Statement in U.S. Appl. No. 11/041,020 dated Mar. 16, 2010.
Supplemental Amendment U.S. Appl. No. 11/041,020 dated Mar. 24, 2010.
Notice of Allowance in U.S. Appl. No. 11/041,020 dated Apr. 26, 2010.
Amendment after Notice of Allowance Under Rule 312 in U.S. Appl. No. 11/041,020 dated Jul. 23, 2010.
Response to Amendment Under Rule 312 Communication in U.S. Appl. No. 11/041,020 dated Aug. 10, 2010.
Official Communication in Chinese Application No. 200510103554.5 dated Jul. 30, 2010.
Office Action in Japanese Application No. 2005-226115 dated Apr. 5, 2011.
Official Communication in Mexican Application No. PA/a/2005/010243 dated Nov. 7, 2007.
Issue Fee and Comments on Statement of Reasons for Allowance in U.S. Appl. No. 11/040,824, dated Oct. 26, 2009.
Preliminary Amendment in U.S. Appl. No. 12/631,686 dated Feb. 23, 2010.
Office Action in U.S. Appl. No. 12/631,686 dated Dec. 23, 2010.
Amendment in U.S. Appl. No. 12/631,686 dated Mar. 23, 2011.
Notice of Allowance in U.S. Appl. No. 12/631,686, dated Jun. 10, 2011.
Official Communication in European Application No. 05255647.9, dated Jul. 2, 2010.
Notice of Allowance in U.S. Appl. No. 11/432,724, dated Mar. 26, 2010.
Applicant summary of interview with examiner in U.S. Appl. No. 11/432,724, dated Apr. 26, 2010.

Request for Continued Examination, Amendment, and Information Disclosure Statement, in U.S. Appl. No. 11/432,724, dated Jun. 28, 2010.

Notice of Allowance in U.S. Appl. No. 11/432,724, dated Aug. 3, 2010.

Di Feng et al. "Novel integrated light-guide plates for liquid crystal display backlight", Journal of optics A: Pure and Applied optics, 7 (2005) 111-117.

Gokturk et al. "A Time-Of-Flight Depth Sensor—System Description, Issues and Solutions," 2004 Conference on Computer Vision and Pattern Recognition Workshop (CVPRW'04), vol. 3, p. 35, 2004.

Imenes et al. "Spectral beam splitting technology for increased conversion efficiency in solar concentrating systems: a review" Solar Energy Materials, Elsevier Science Publishers B.V. Amsterdam, NL, vol. 84, Oct. 1, 2004 (available online Jun. 1, 2004), pp. 19-69, XP002474546.

* cited by examiner

SYSTEM AND METHOD OF REDUCING COLOR SHIFT IN A DISPLAY

CROSS REFERENCE TO RELATED APPLICATIONS

This application is a divisional of U.S. patent application Ser. No. 11/041,020, filed Jan. 21, 2005, entitled "SYSTEM AND METHOD OF REDUCING COLOR SHIFT IN A DISPLAY," which claims priority to U.S. Provisional Application No. 60/613,482, filed on Sep. 27, 2004, the entirety of which are hereby incorporated herein by reference.

FIELD

The field of the invention relates to microelectromechanical systems (MEMS).

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

One embodiment is a display system for displaying an image. The display system includes a plurality of interferometric modulators configured to modulate light incident on a surface thereof. The display system further includes a converging optical element positioned with respect to a surface of at least one of the plurality of interferometric modulators such that a focal length of the optical element is greater than a distance between the optical element and the surface.

Another embodiment is a method of fabricating a display system. The method includes forming a plurality of interferometric modulators on a first substrate. The method further includes forming a converging optical element on a second substrate. The optical element is positioned with respect to at least one surface of at least one of the plurality of interferometric modulators such that a focal length of the optical element is greater than a distance between the optical element and the at least one surface. Another embodiment is a display system fabricated according to this method.

Another embodiment is a display system for displaying an image. The display system includes means for interferometrically modulating light incident thereon and means for converging light adapted so as to limit color shift of at least a portion of the image between different viewing locations.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout.

In preferred embodiments, the invention includes an optical element, such as a lens, fresnel lens, diffractive optical element, or binary optical element, positioned between an interferometric display and a viewer of the display. The optical element is configured to reduce color shift that may be seen as the viewing angle or light angle changes.

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
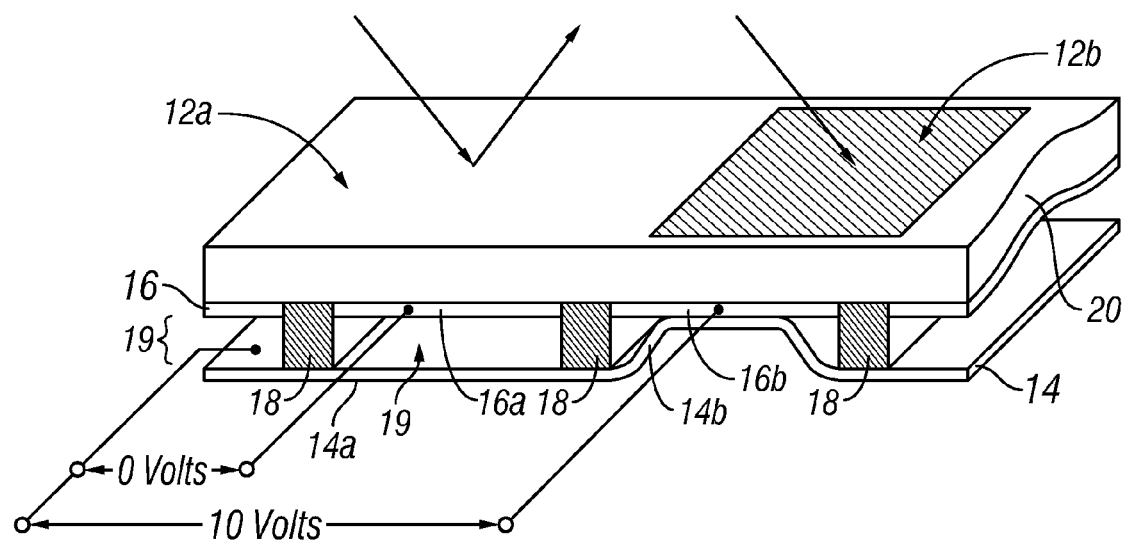
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
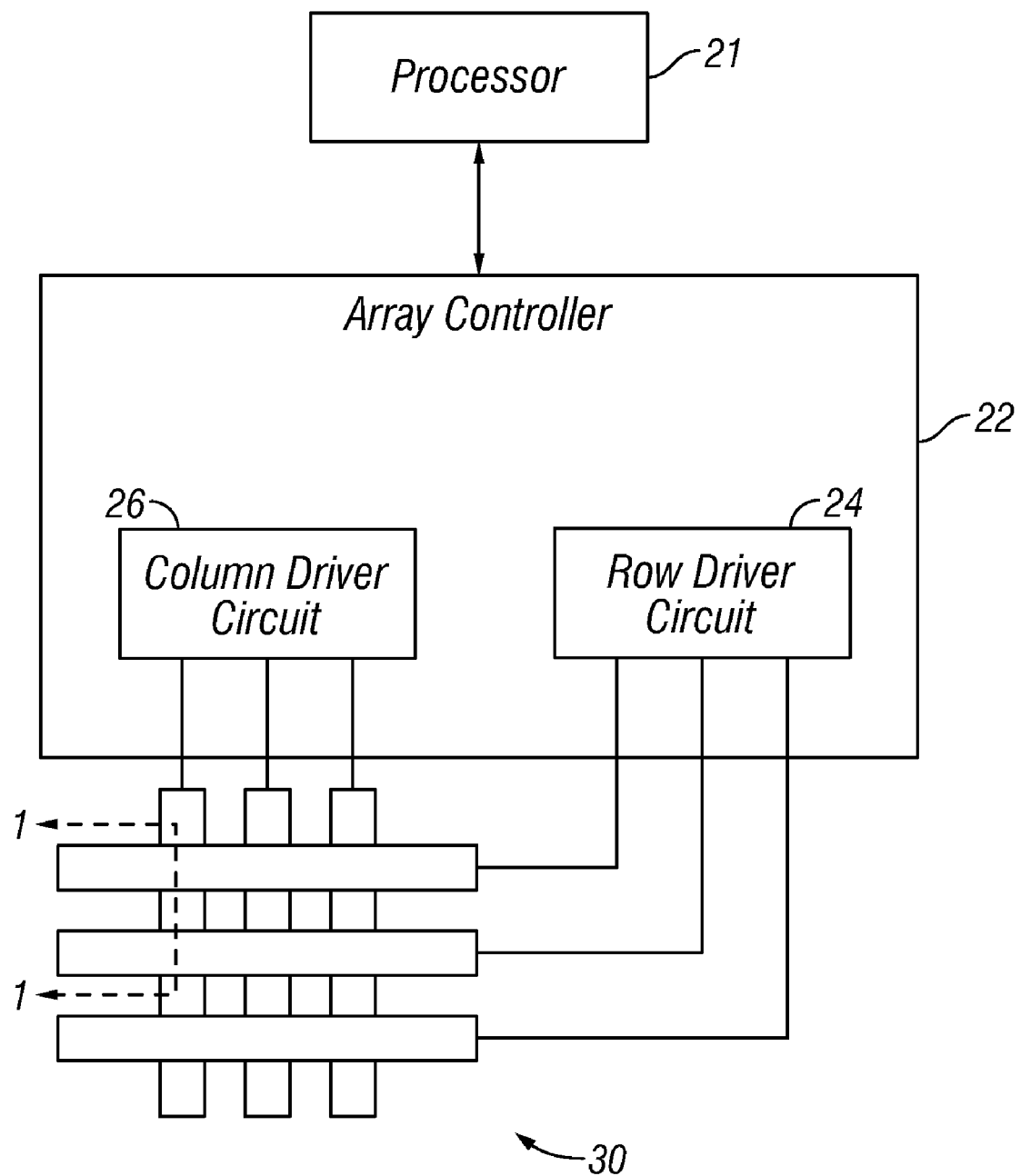
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
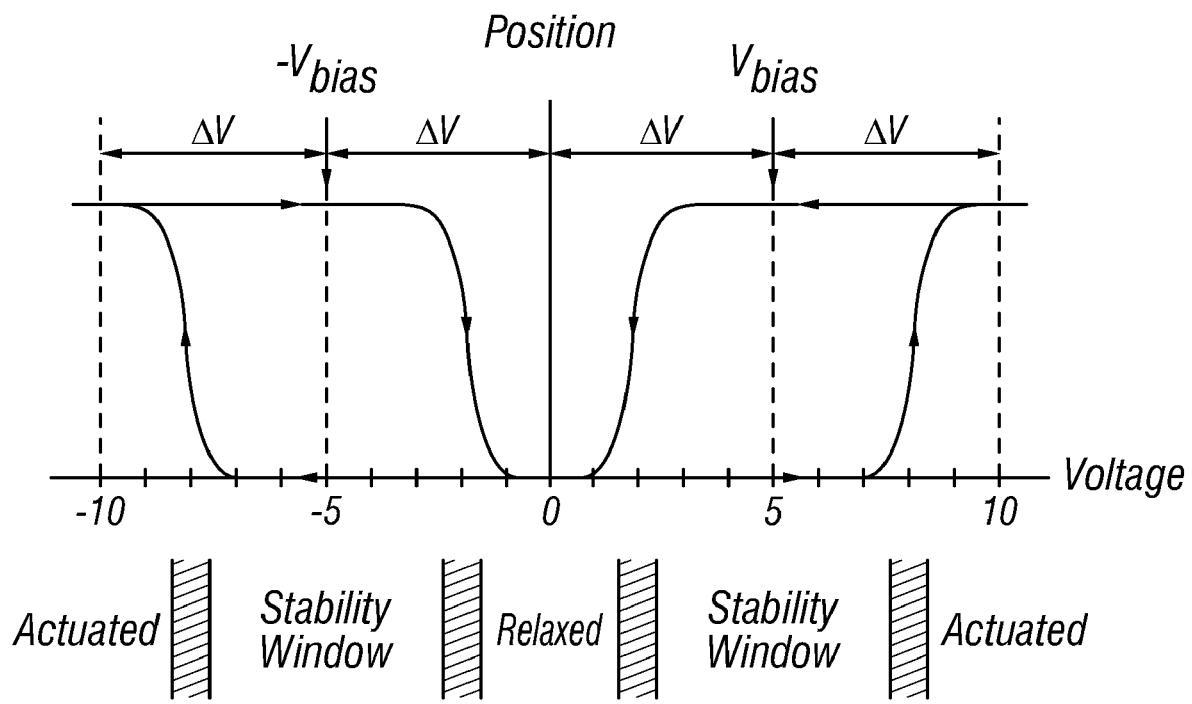
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
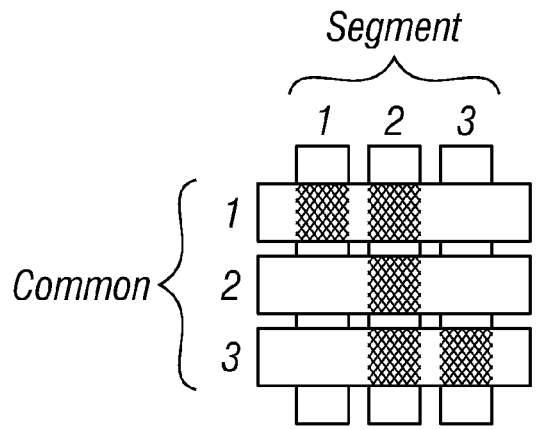
FIGS. 5A and 5B illustrate one exemplary timing diagram for row and column signals that may be used to write a frame of display data to the 3×3 interferometric modulator display of FIG. 2.
Figure 5B:
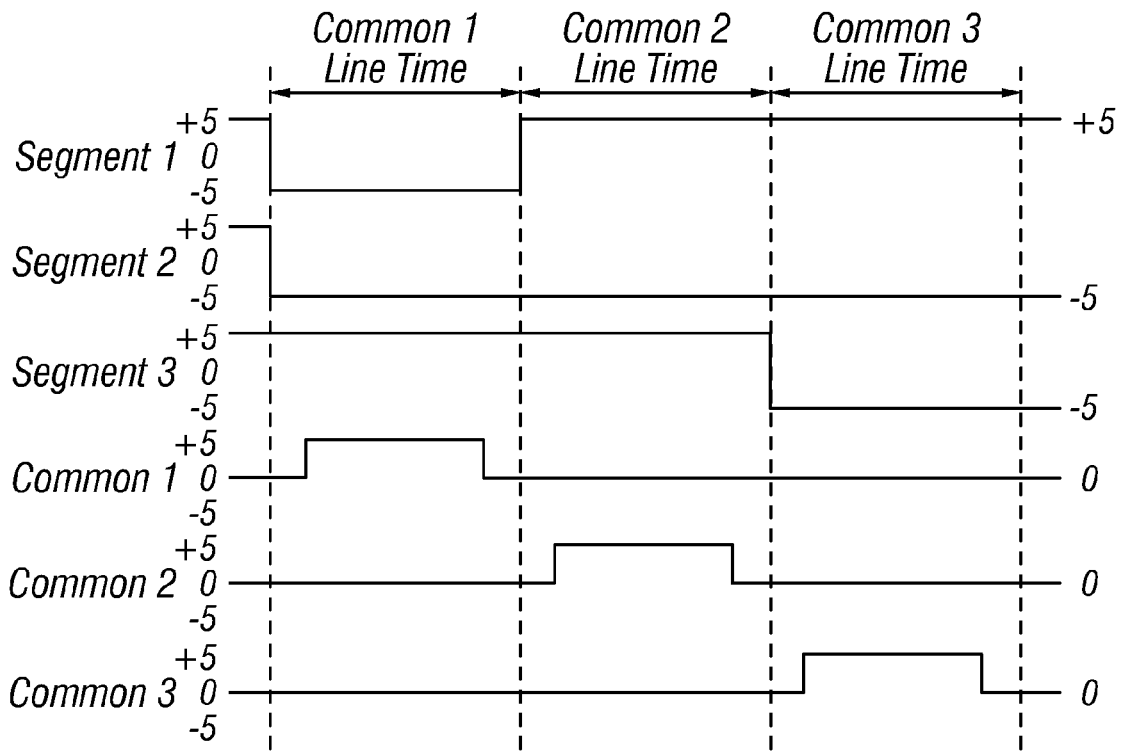

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
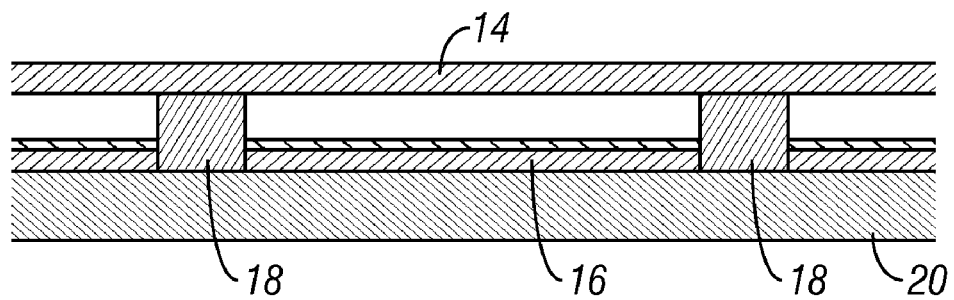
FIG. 6A is a cross section of the device of FIG. 1.
Figure 6B:
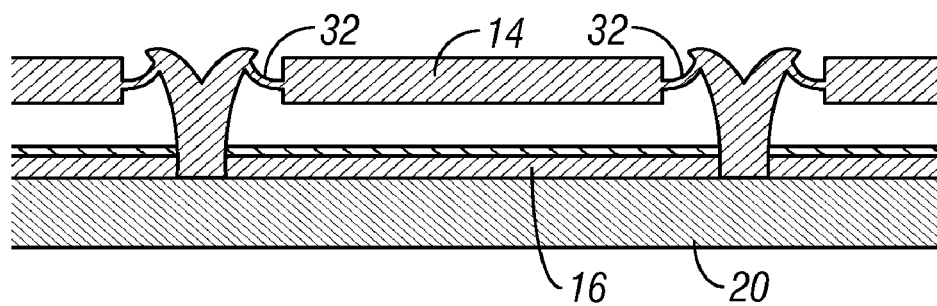
FIG. 6B is a cross section of an alternative embodiment of an interferometric modulator.
Figure 6C:
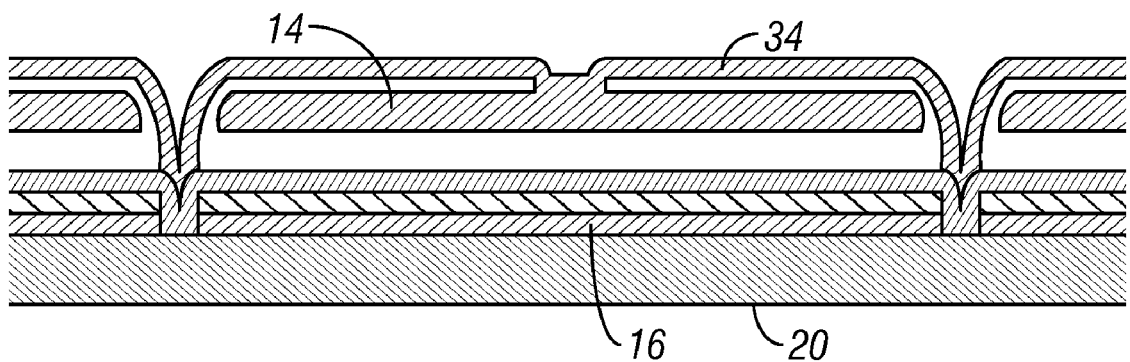
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
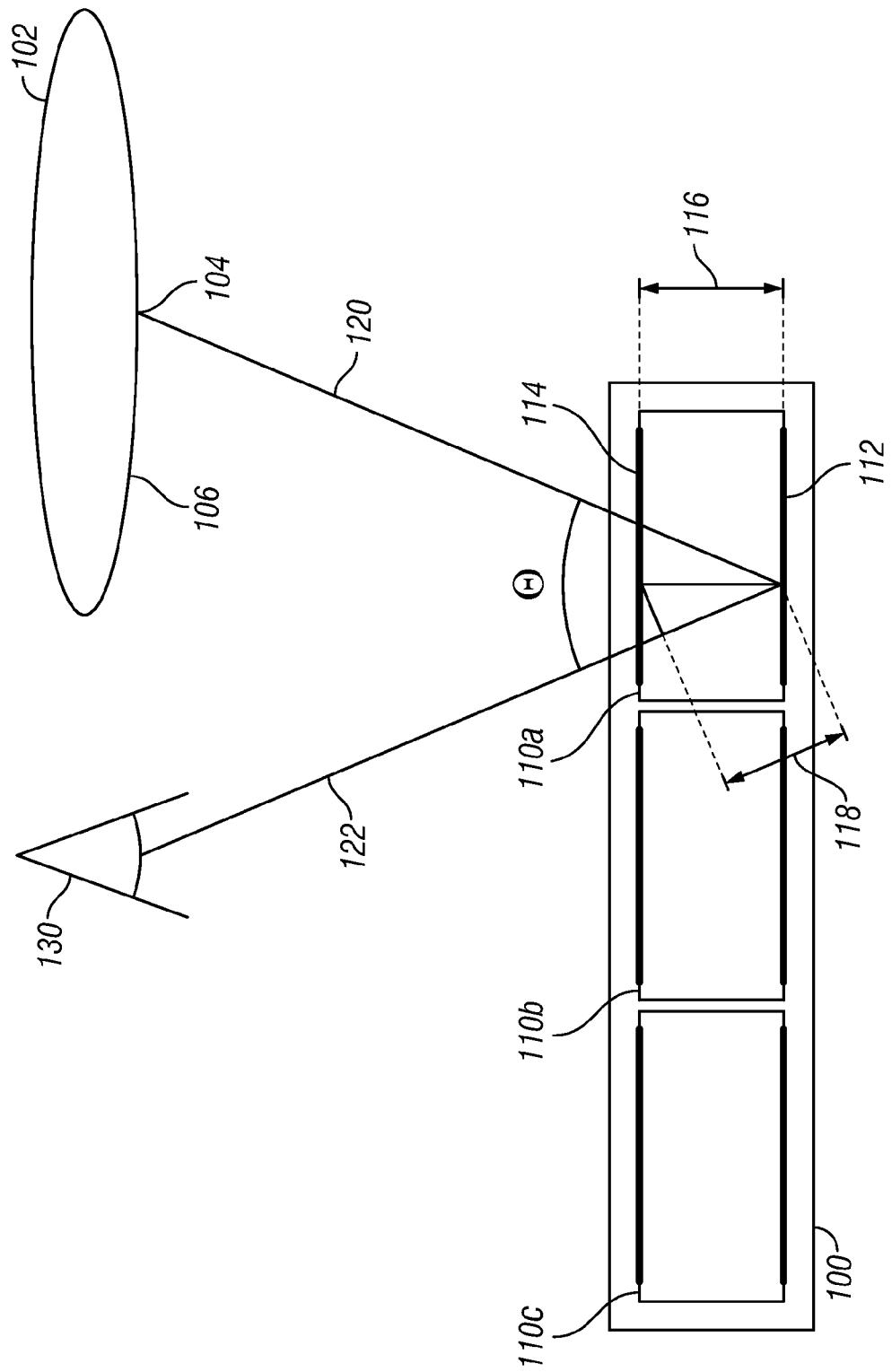
FIG. 7 is a schematic side profile view of one embodiment of an interferometric modulator display depicting the optical path from a light source to a viewer via an interferometric modulator element of the display.

FIG. 7 is a schematic side profile view of one embodiment of an interferometric modulator display 100 depicting an optical path from a light source 102 to a viewer 130 via the display 100. The light source 102 depicted in FIG. 7 transmits light from a range of locations that include, for example, locations 104 or 106. The interferometric modulator display 100 includes an array of the interferometric light modulators 110a, 110b, 110c. Although an array of three light modulators is depicted in FIG. 7, embodiments of the display 100 may include thousands or millions of modulators. Each of the light modulators 110a, 110b, and 110c includes a pair of mirrors 112 and 114. The mirrors 112 and 114 are positioned substantially parallel to each other and are spaced apart at a distance 116 so as to define an optical cavity therebetween. The color of light that is reflected from the optical cavity is at least partly determined by the distance 116. In an exemplary embodiment of the display 100 that is configured to produce a color image, the distance 116 is selected for each of the light modulators 110a, 110b, 110c so that each light modulator 110a, 110b, 110c reflects light substantially of a particular color, for example, red, blue, or green. In other embodiments, the distance may be substantially the same for all modulators 110 in the display 100.

In one embodiment, the display 100 produces a displayed image by reflecting light that arrives at the display 100 along many optical paths from many sources. In one exemplary optical path, the light from location 104 arrives at the display 100 along the path 120. This light is modulated by the interferometric modulator element 110a so that a portion of the light along path 120 is reflected along a path 122 to the viewer 130. The incident and reflected light along paths 120 and 122 define an angle θ with respect to each other. Light traveling from the source 102 to the viewer 130 that is reflected from mirror 114 travels a shorter path (not shown) than does light traveling from the source 102 to the viewer 130 that is reflected from mirror 112. The path length difference between these two paths, along with several other factors, determines the peak wavelength of light that the viewer 130 perceives as being reflected from the modulator element 110a. This path length difference is roughly proportional to the cosine of the angle θ/2 multiplied times the distance 116. For θ=0, cos θ/2=1, and the path length difference is twice the distance 116. As the angle θ becomes larger cos θ/2 decreases, and the path length distance (twice the distance 118) defined by the two mirrors 112 and 114 for light following paths 120 and 122 thus effectively becomes shorter than twice the distance 116. This decreased optical path distance 118 generated in the modulator element 110a corresponds to a shift in the color of light that is reflected by the modulator elements 110a. At sufficiently large angles θ, the viewer 130 can perceive this color shift in the colors produced by the display 120.

Figure 8:
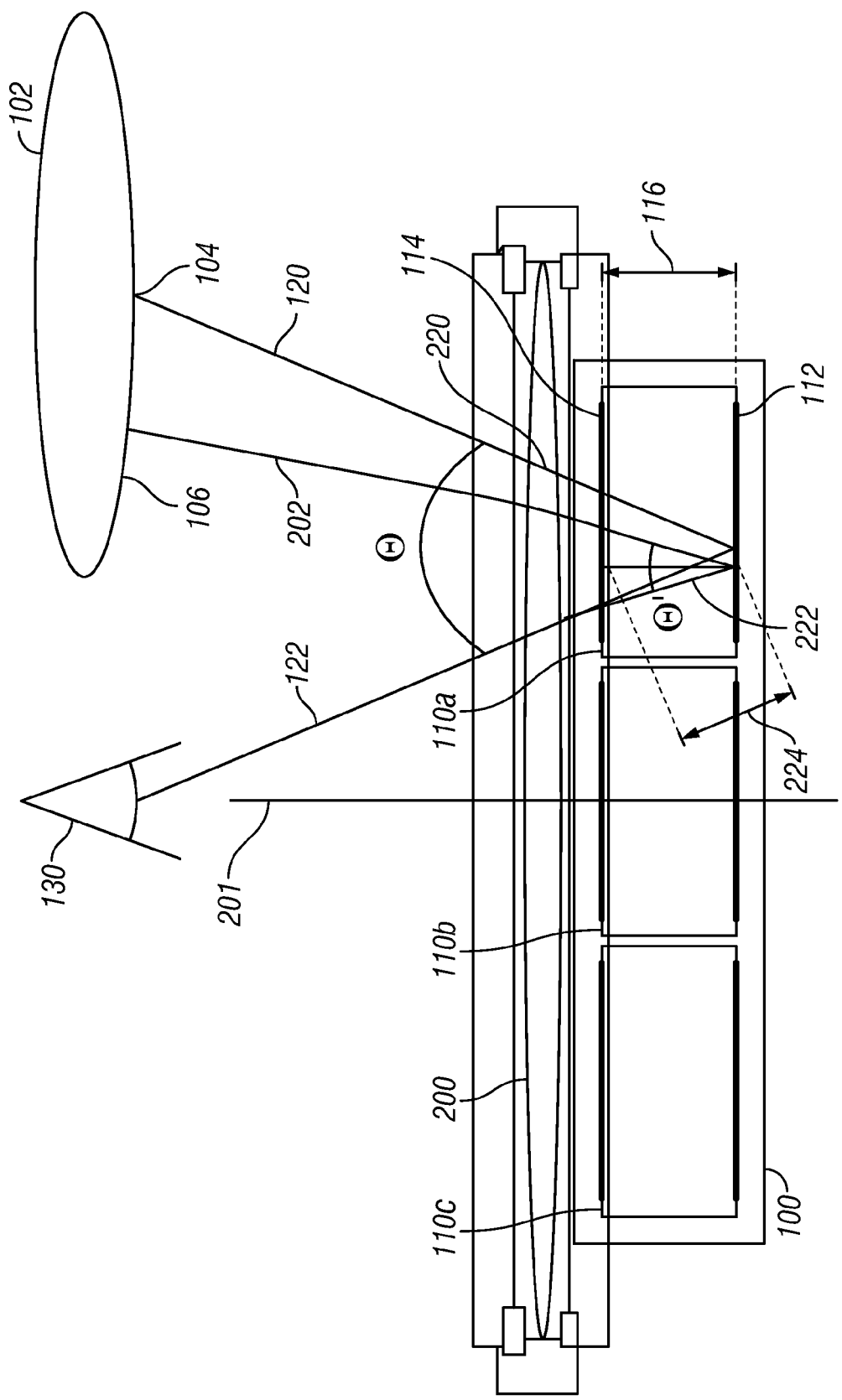
FIG. 8 is a schematic side profile view of another embodiment of the interferometric modulator display, similar to that depicted in FIG. 7, that includes a lens in the optical path from the light source to the viewer via the interferometric modulator element.

FIG. 8 is a schematic side profile view of another embodiment of the interferometric modulator display 100 that includes a converging lens 200 that spans the entire viewing surface of the display 100. The lens 200 is positioned at a distance along the optical axis 201 from the modulators 110 that is less than the focal length of the lens 200. In the embodiment of FIG. 8, which includes the lens 200, one optical path includes a path segment 202 along which light travels from the location 106 to the display 100. In one embodiment, the lens 200 has an optical aperture that is greater than the total aperture of two or more of the interferometric modulators of the display 100. In one embodiment, the lens 200 has an optical aperture that is greater than the total aperture of the array of interferometric modulators. At least a portion of the light from the path segment 202 is transmitted through the lens 200 and reflected via surfaces of the mirrors of the interferometric modulator 110a. The reflected light is again transmitted through the lens 200 to the viewer 130. Conceptually, the lens 200 selects incoming light from a location 106 on the source 102 for transmission through the modulator element 110a to the viewer 130. The optical paths of light to the viewer through the lens 200 are thus selected to have a greater angle of incidence with the reflective surfaces of the modulators (closer to 90°) than the angle of incidence of the optical paths to the viewer in an embodiment without the lens 200. Transmission of this light to the viewer 130 reduces the perceived color shift by altering the path length difference within the optical cavity so that the distance traveled is closer to that followed by light traveling along the optical axis 201.

In one embodiment, the lens 200 is configured to direct light to the viewer 130 substantially via an optical path that includes optical path segments 202, 220, 222, and 122. The source for light traveling along path 202 is location 106 on the source 102. The selected location 106 is closer to the central axis of the display system than is location 104 where the light traveling along path 120 originated. In such an embodiment of the display 100, the narrowing of the illumination source angles is substantially responsible for the steeper angles of the light rays within the modulator elements 110. The reflected path segment 222 and the incident path segment 220 define an angle θ'. The lens 200 is selected so that the angle θ' is smaller than the angle θ defined by the path segments 120 and 122, which correspond to light paths existing in embodiments without the lens 200, as in the display of FIG. 7. The smaller subtended angle θ' at the interferometric modulator element 110a corresponds to a path length difference of twice the distance 224, and since θ' is smaller than θ the path length 224 will be longer than the path length 118 of FIG. 7. The longer path length corresponds to a reduction in the perceived color shift of off-axis light reflected by the display 100.

In one embodiment, the display 100 is a direct-view interferometric display that is viewed using the light source 102 having a broadband, ambient illumination in which substantially all points in the field behind the viewer are similarly illuminated so that light arriving from one source location is on average insignificantly different than light arriving from any other source location. The lens 200 thus selects light from a point in the field that subtends a smaller angle with respect to the viewer 130 than would be selected without the lens 200.

In one embodiment, the converging lens 200 is a convex lens. One of skill in the art can use techniques that are well known in the art to derive the shape and materials for constructing the lens 200 to have the desired characteristic properties. However, in many typical display applications, such as in handheld or other portable display devices, the lens 200 is typically undesirably large and bulky. Moreover, structural support (not shown) for the lens 200 can add cost and complexity to the display 100, and thus tends to render impractical the integration of lens 200 into such a typical product.

As an alternative to the converging lens 200, for example, in order to reduce this bulk, embodiments may include any other suitable converging optical element, including a Fresnel lens. The Fresnel lens is desirably smaller and less bulky than a simple curved lens embodiment such as that shown as the lens 200 in FIG. 8. However, even the reduced bulk of the Fresnel lens still tends to be impractically large for many portable applications. Other embodiments of the lens 200 may include any other type of converging lens or optical element that is known in the art.

An alternative to use of a lens in light control applications is use of diffractive optical elements including holographic optical elements. Diffractive optical elements ("DOE"), which may be considered conceptually to be step-wise approximations to an optical function (for example a Fresnel lens), are light modulating elements that in one embodiment comprise structures that have been patterned and etched onto a substrate using photolithographic techniques so as to diffract light in a predetermined manner, for example, to converge or focus light. In one embodiment, the dimensions of the structures are a few microns in size, depending on the wavelength of the light to be affected. A suitable computer program is typically used to calculate the pattern and shape of the structures that define a DOE to perform a particular optical function, e.g., of a converging lens. Examples of such software include CODE V, available from Optical Research Associates, Inc., Pasadena, Calif., OSLO, available from Lambda Research Associates, Inc, Rochester, N.Y., and ZEMAX, available from Focus Software, Tucson, Ariz. For example, more details regarding diffractive optics, including the calculation of a suitable lens structure, may be found in *Diffractive Optics: Design, Fabrication, & Test*, Donald C. O'Shea, Thomas J. Sulski, Alan D. Kathman, Dennis W. Prather (Society of Photo-Optical Instrumentation Engineering 2003).

One type of DOE is a binary optical element ("BOE"). A binary optical element is a diffractive optical element comprising a discrete number of diffractive surfaces. The simplest form is comprised of single step elements, having two diffractive surfaces, such as formed by single lithographic step. The two surfaces introduce either a 0 or π-phase difference in the incident wavefront. A multilevel binary element includes N levels of material, e.g., as formed by N lithographic steps. The N levels can produce $2^N$ phase levels.

Figure 9:
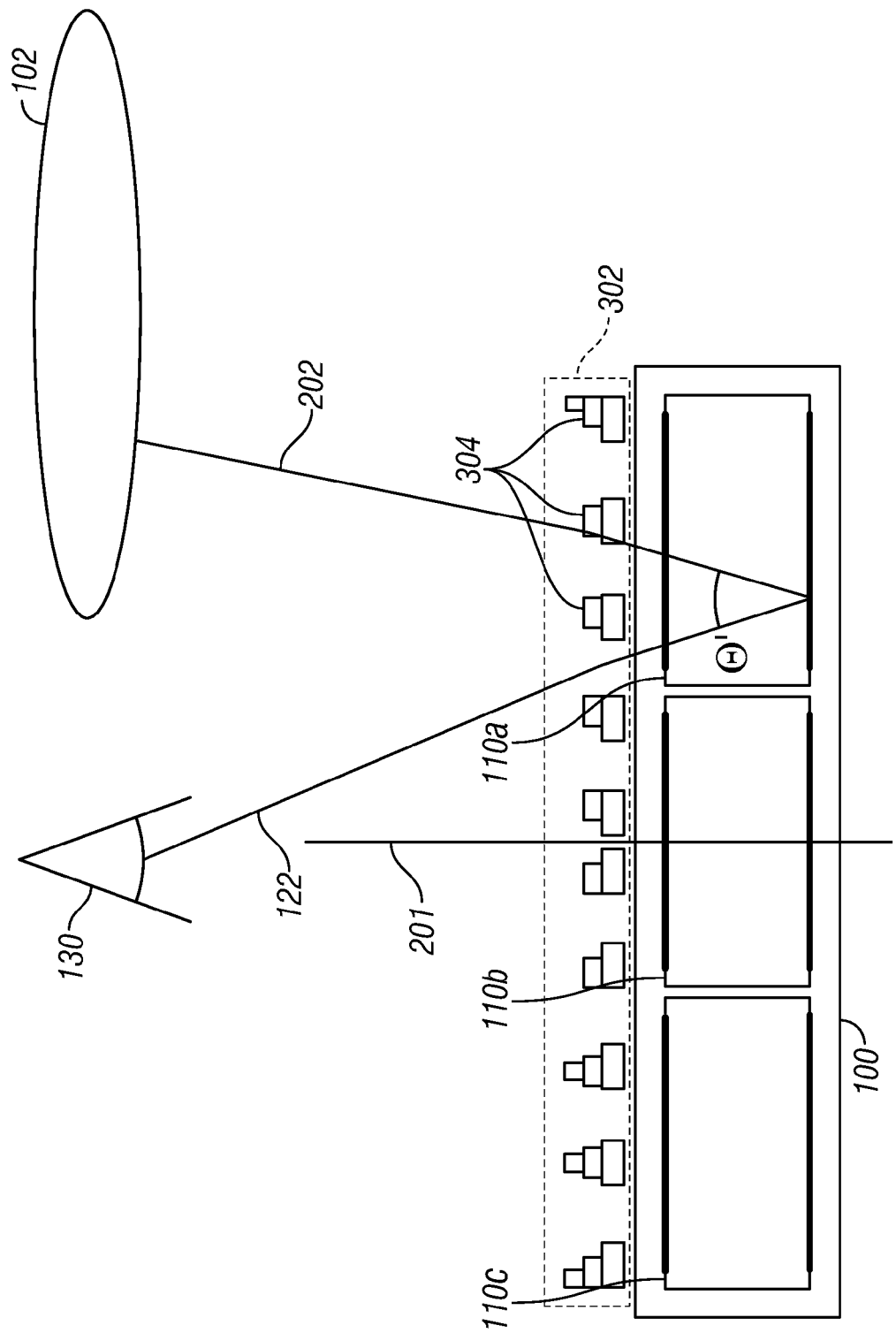
FIG. 9 is a schematic side profile view of another embodiment of the interferometric modulator display, similar to that depicted in FIG. 8, that includes a diffractive optical element in the optical path from the light source to the viewer via the interferometric modulator element.

FIG. 9 is a schematic side profile view of an embodiment of the interferometric modulator display 100 that includes a diffractive optical element 302 in the optical path from the location 106 of the light source 102 to the viewer 130 via the interferometric modulator element 110a. The illustrated embodiment of the DOE 302 is a binary optical element having N=3. In other embodiments, N may be any number. In some embodiments, N may be 1, 2, 3, 4, or 5. In other embodiments, N may be in the range of 1-10.

The DOE 302 includes a converging DOE. A converging DOE is a DOE that is configured to perform the optical function of a converging lens, i.e., converge light toward the optical axis 201 of the DOE 302. It is to be recognized that the elements depicted in each of FIGS. 7-10 are not drawn to scale nor intended to be accurate illustrations of any structure for performing the optical functions attributed to the elements. The diffractive optical element (DOE) 302 typically includes a large number of small elements 304. Each of the elements 304 includes a stack of one or more elements. Some such elements 304 may be define a staircase-like shape. As discussed above, the size and position of the elements 304 are typically calculated using a computer and suitable software. In one embodiment, the elements are arranged in a pattern that defines a set of concentric circular rings. In another embodiment, the elements 302 are grouped into local structures that collectively accomplish the optical functions described herein. The elements 304 can be formed using photolithographic techniques using suitable materials such as photoresist, hardened photo resist (e.g., hard baked in an oven), silica, fused silica, or plastics. In one embodiment, a series of layers of material having a particular thickness and index of refraction are deposited and etched to form the elements 304 of the DOE 302. Thus, as with the lens 200, the DOE 302 selects light rays originating from the location 106 of the light source 102. At least a portion of this light is reflected by the interferometric modulator element 110a along the path segment 122 to the viewer 130.

In one embodiment, the DOE 302 is formed on a separate substrate that is attached to the display 100. In one embodiment, the separate substrate includes a film. The display 100 may include a diffuser (not shown) for scattering the specular light reflected by the interferometric modulator elements 110a in a generally lambertian pattern. In one embodiment, the diffuser includes the DOE 302. In another embodiment, the DOE 302 is formed on the same substrate as the interferometric modulators 110a, 110b, and 110c of the display 100. For example, the interferometric modulators 110a, 110b, and 110c may be formed on a glass substrate. In one embodiment, each of the interferometric modulators 110 110a, 110b, and 110c is formed on a first side of the glass substrate and the DOE 302 is formed on the opposite side of the glass substrate.

In another embodiment, the DOE 302 is formed on the same side of the substrate as the modulators 110. In one such embodiment, the elements 304 are formed on the substrate and covered with a planarization layer. The interferometric modulators 110 110a, 110b, and 110c are then formed on the planarization layer. In one embodiment, the planarization material has an index of refraction that is different from the index of refraction of the material used to make the diffractive elements 304. The pattern of the diffractive elements 304 in the DOE 302 is calculated based on the indices of refraction of both the material forming the diffractive elements 304 and the material forming the planarization layer.

Figure 10:
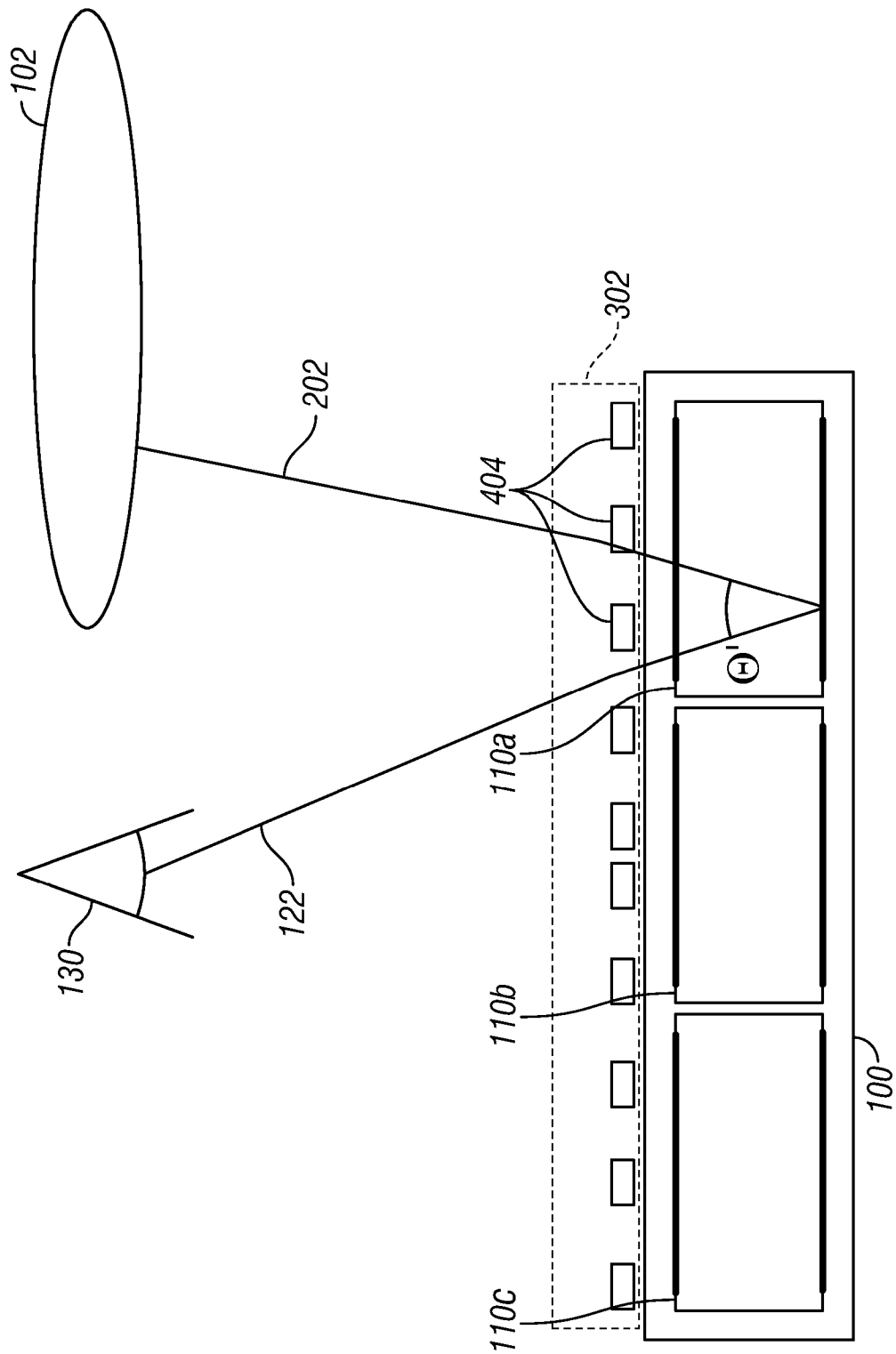
FIG. 10 is a schematic side profile view of another embodiment of the interferometric modulator display, similar to that depicted in FIG. 8, that includes a single level binary optical element in the optical path from the light source to the viewer via the interferometric modulator element.

In one embodiment, the diffractive optical element 302 is formed of a simple, N=1, binary optical element. FIG. 10 is a schematic side profile view of another embodiment of the interferometric modulator display 100 that includes an embodiment of the DOE 302 having N=1 in the optical path from the location 106 of the light source 102 to the viewer 130 via the interferometric modulator element 110a. The embodiment of the DOE 302 in FIG. 10 is created by use of a set of BOE structures 404 that generally are formed to have approximately the same height or thickness as each other. Although the exemplary DOE 302 of FIG. 10 is depicted as having uniformly spaced structures 404, the width and the spacing of the structures 404 may be adjusted to achieve the desired optical function. In the illustrated embodiment, the DOE 302 may be formed from a single layer of material that is photolithographically patterned and etched. Such an embodiment of the DOE 302 is formed in fewer steps than the embodiment of the multi-level binary optical element 302 of FIG. 9. The single level DOE 302 may be placed in different positions and on different substrates and planarized in the same ways as described above for the multiple level DOE 302.

Binary optical elements such as DOE 302 define only an approximation of a desired optical function. Generally, the more layers in the binary optical element, the better the approximation of the desired optical function. However, an approximation of the optical functions of the converging lens 200 at least partially reduces the color shift of the light from the light source 102 that is reflected by the interferometric modulator 110a to the viewer 130. In some embodiments, this partial reduction in color shift is sufficient to improve the perceived color accuracy of the display 100 for off-axis light sources and off-axis viewing.

Embodiments of the DOE 302 may be formed in relation to the display 100 as with any of the embodiments described above with respect to the DOE 302. For example, the DOE 302 may be formed on a diffuser, on a separate substrate, or on either side of the substrate of the interferometric modulators 110a, 110b, and 110c.

For larger displays, e.g., displays with diagonal sizes of greater than approximately 30 inches, at typical household viewing distances, e.g., a few meters, a viewer may perceive angular color shift of a portion of the display even when positioned at the center of the display. It is to be recognized that embodiments of the optical element, such as the diffractive optical element 302, may be configured to reduce this color shift for at least a portion of the display.

Embodiments of the diffractive optical element 302 may be configured to perform other optical functions. For example, it may be desirable in some embodiments to direct light from the display into a range of preferred viewing positions. Thus, in such embodiments, the diffractive optical element 302 may also be configured to direct light from the display 100 so as to control the field of view, to limit or expand the direction of view of the image, or to control the size of the image. In one embodiment, the optical element includes a lenticular component that is configured to control the field of view of the display horizontally (with reference to a viewer) by directing a portion of the light from the display to a range of angles, e.g., by spreading the light from the display 100 around the horizontal axis of the display 100. In one embodiment, the optical element spreads the light through a greater range of angles along the horizontal axis than along the vertical axis. This increase the amount of light received at off axis viewing positions, for example, at a range of seating positions in a room around the display. In one embodiment, the diffractive optical element 302 is further configured to perform the optical function of a lenticular lens.

In another embodiment, the display 100 may include or be configured to use a particular light source or set of light sources having known positions relative to the display 100. In such an embodiment, the diffractive optical element 302 is tailored to direct the light based on the location, amount of illumination, or aperture of the light sources. In one embodiment, the light sources include one or more light emitting diodes positioned around the front of the display 100 so as to illuminate the display. In such an embodiment, the DOE 302 is configured to compensate for non-uniform illumination of the display by the light sources or for the effects of other undesirable properties of the light sources by, for example, varying the amount of light transmitted through the DOE 302 over the surface of the display 100.

In view of the above, one will appreciate that embodiments of the invention overcome many of the problems in the art by providing a interferometric modulator display with an optical element that reduces the color shift evident as viewing angle or light angle change. Moreover, this optical element can be cost-effectively included in the display by the use of a few additional photolithographic steps.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of fabricating a display system, the method comprising:
    providing a reflective display having a plurality of interferometric modulators on a first substrate;
    providing a converging optical element disposed on a second substrate and having a lens aperture greater than a total aperture of two of the plurality of interferometric modulators; and
    positioning the optical element with respect to at least one surface of at least one of the plurality of interferometric modulators such that a focal length of the optical element is greater than a distance between the optical element and the at least one surface so as to reduce color shift of an image between two viewing locations.

2. The method of claim 1, wherein providing the converging optical element comprises depositing at least one layer of material on the second substrate.

3. The method of claim 2, wherein providing the converging optical element further comprises patterning the at least one layer of material.

4. The method of claim 1, wherein providing the converging optical element comprises providing a diffractive optical element.

5. The method of claim 4, wherein providing the diffractive optical element comprises providing a binary optical element formed on the second substrate.

6. The method of claim 4, wherein providing the diffractive optical element comprises providing a patterned material having a plurality of diffractive features.

7. The method of claim 1, wherein the first substrate comprises the second substrate.

8. The method of claim 1, wherein the optical element is positioned relative to the plurality of modulators such that the first substrate is located therebetween.

9. The method of claim 1, wherein the optical element is positioned so as to be located between the plurality of interferometric modulators and the first substrate.

10. The method of claim 1, wherein the optical element is positioned such that the plurality of interferometric modulators are located between the optical element and the first substrate.

11. The method of claim 1, wherein providing the converging optical element comprises providing a lenticular lens.

12. The method of claim 1, wherein the optical element is configured to spread the modulated light differently along a first axis of the display system than along a second axis of the display system.

13. The method of claim 1, further comprising:
    disposing a light source so as to illuminate the optical element; and
    configuring the optical element to compensate for at least one optical property of the light source.

14. A display system fabricated by the method of claim 1.

15. A display system fabricated by a method comprising:
    providing a reflective display having a plurality of interferometric modulators on a first substrate;
    providing a converging diffractive optical element disposed on a second substrate and having a lens aperture greater than a total aperture of two of the plurality of interferometric modulators;
    positioning the optical element such that the optical element redirects light that is incident on at least one surface of at least one of the plurality of interferometric modulators so as to reduce color shift of an image between two viewing locations.

16. The display system of claim 15, wherein providing the optical element comprises depositing at least one layer of material on the substrate.

17. The display system of claim 16, wherein providing the optical element further comprises patterning the at least one layer of material.

18. The display system of claim 15, wherein providing the optical element comprises providing a binary optical element formed on the substrate.

19. The display system of claim 15, wherein providing the optical element comprises providing a patterned material having a plurality of diffractive features.

20. The display system of claim 15, wherein the first substrate comprises the second substrate.

21. The display system of claim 15, wherein the optical element is positioned relative to the plurality of modulators such that the first substrate is located therebetween.

22. The display system of claim 15, wherein the optical element is positioned so as to be located between the plurality of interferometric modulators and the first substrate.

23. The display system of claim 15, wherein the optical element is positioned such that the plurality of interferometric modulators are located between the optical element and the first substrate.

24. The display system of claim 15, wherein providing the optical element comprises providing a lenticular lens.

25. The display system of claim 15, wherein the optical element is configured to spread the modulated light differently along a first axis of the display system than along a second axis of the display system.

26. The display system of claim 24, wherein the first axis is a horizontal axis and the second axis is a vertical axis.

27. The display system of claim 15, further comprising:
   disposing a light source so as to illuminate the optical element; and
   further configuring the optical element to compensate for at least one optical property of the light source.

28. A display system for displaying an image, the display system comprising:
   a reflective display having a plurality of interferometric modulators configured to modulate light incident thereon; and
   a converging diffractive optical element configured to redirect light incident on at least one of the plurality of interferometric modulators, the optical element having a lens aperture greater than a total aperture of two of the plurality of interferometric modulators and configured to reduce color shift of an image between two viewing locations.

29. The display system of claim 28, wherein the optical element comprises a positive power optical element.

30. The display system of claim 28, wherein the optical element comprises a binary optical element.

31. The display system of claim 28, wherein the optical element comprises a diffuser.

32. The display system of claim 28, further comprising:
   a substrate supporting the plurality of interferometric modulators and supporting the optical element.

33. The display system of claim 32, wherein the substrate is located between the optical element and the plurality of modulators.

34. The display system of claim 32, wherein the diffractive optical element is located between the plurality of interferometric modulators and the substrate.

35. The display system of claim 32, wherein the plurality of interferometric modulators are located between the optical element and the substrate.

36. The display system of claim 32, wherein the optical element is configured to spread the modulated light differently along a first axis of the display system than along a second axis of the display system.

37. The display system of claim 32, wherein the first axis is a horizontal axis and the second axis is a vertical axis.

38. The display system of claim 32, further comprising:
   a light source, wherein the optical element is configured to compensate for at least one optical property of the light source.

39. The method of claim 1, wherein the plurality of interferometric modulators are configured to output colored light.

40. The method of claim 39, wherein each of the plurality of interferometric modulators is configured to output colored light.

41. The display system of claim 15, wherein the plurality of interferometric modulators are configured to output colored light.

42. The display system of claim 41, wherein each of the plurality of interferometric modulators is configured to output colored light.

43. The display system of claim 28, wherein the plurality of interferometric modulators are configured to output colored light.

44. The display system of claim 43, wherein each of the plurality of interferometric modulators is configured to output colored light.

45. The method of claim 1, wherein the display system has a diagonal size greater than 30 inches.

46. The display system of claim 15, wherein the display system has a diagonal size greater than 30 inches.

47. The display system of claim 28, wherein the display system has a diagonal size greater than 30 inches.

* * * * *